March 21, 1961
C. R. CARLSON
2,976,391
FOOD WARMER
Filed July 31, 1957
4 Sheets-Sheet 1
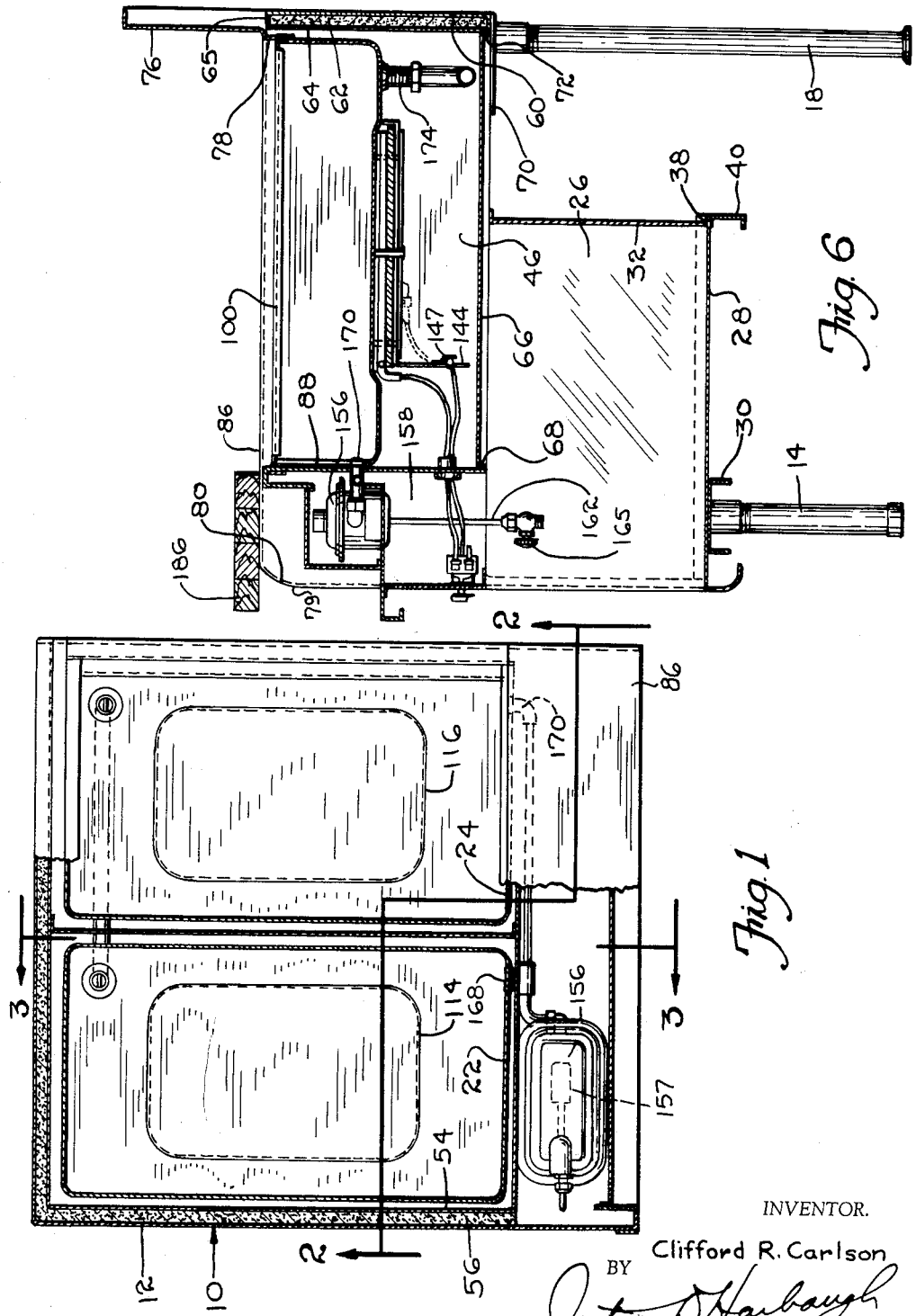
INVENTOR.
Clifford R. Carlson
BY
Iratom D Harbaugh
Atty March 21, 1961
C. R. CARLSON
2,976,391
FOOD WARMER
Filed July 31, 1957
4 Sheets-Sheet 2
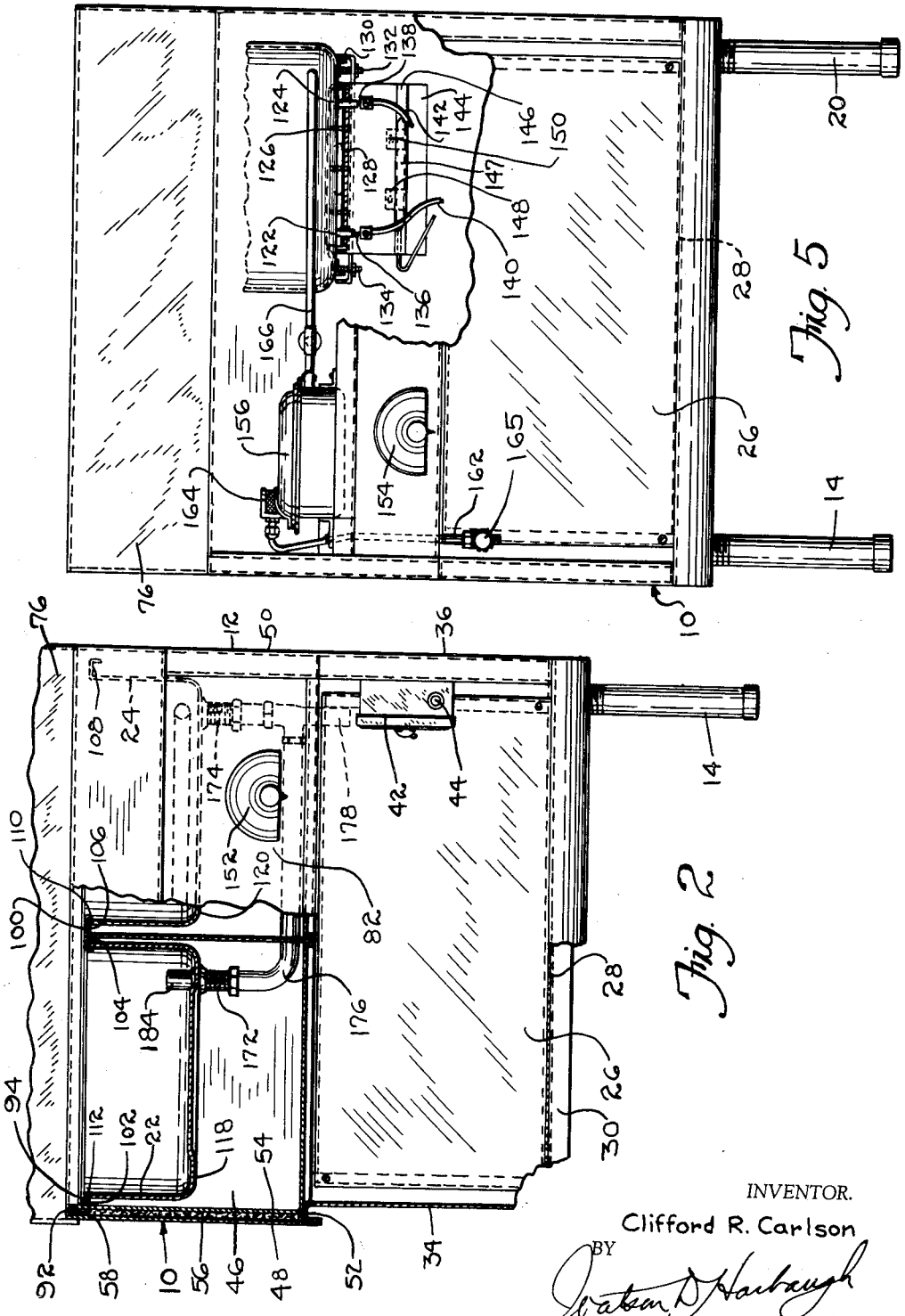
INVENTOR.
Clifford R. Carlson
BY
Atty.

March 21, 1961
C. R. CARLSON
2,976,391
FOOD WARMER
Filed July 31, 1957
4 Sheets-Sheet 3
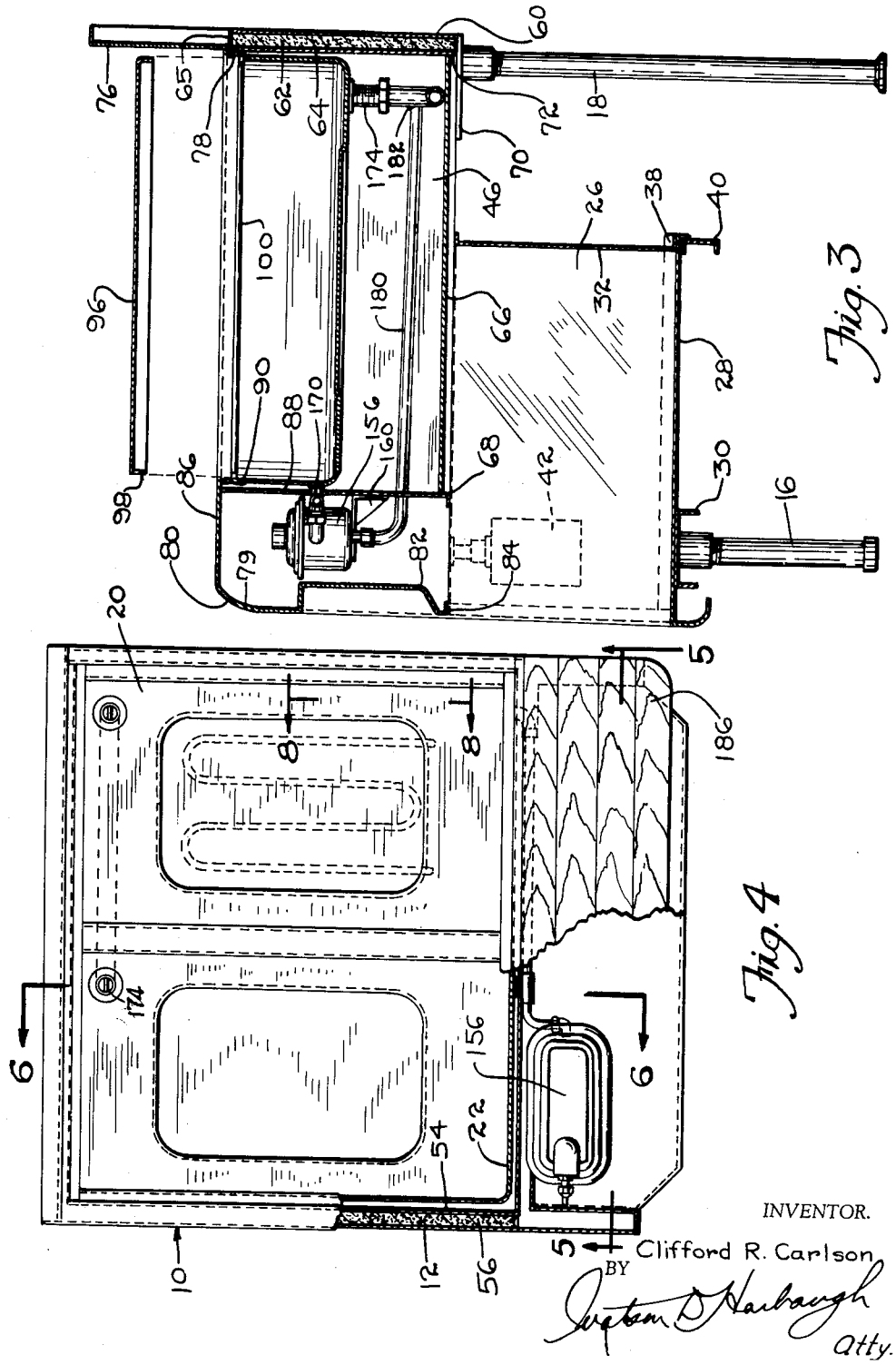
INVENTOR.
Clifford R. Carlson
BY
Atty.

March 21, 1961 C. R. CARLSON 2,976,391
FOOD WARMER
Filed July 31, 1957 4 Sheets-Sheet 4

INVENTOR.
Clifford R. Carlson
BY
Atty.

United States Patent Office 2,976,391
Patented Mar. 21, 1961

2,976,391
FOOD WARMER

Clifford R. Carlson, Grand Haven, Mich., assignor to The Bastian-Blessing Company, Chicago, Ill., a corporation of Illinois Filed July 31, 1957, Ser. No. 675,447

11 Claims. (Cl. 219—35)

This invention relates to food warmers, and more particularly to a food warmer adapted to operate either by moist or dry heat, selectively, with efficient heat transfer and control of individual well units.

Heretofore, hot food units have been available for maintaining food to be served at temperatures varying from 125° to 200° F. by means of either gas or electric heat, but they have been either of the dry-heat type or, where moist heat was used, have suffered from the disadvantage that a single well was used for all food containing units so that an individual control was difficult or impossible. Where dry heat was used, the amount of heat available at a given position of the unit was dependent on the proximity to the heating unit so that undesirable variability of temperature was produced. This problem was not met with in "moist" operation, and other advantages have been provided by the latter method such as the fact that the operating temperatures are lower (maximum temperature being below the boiling point), and the fact that the foods are in better condition because drying from excessive heat around the wells is eliminated, while moistured droplets from the vapor emitted generally collect over the food. On the other hand, dry heat dispenses with the requirements of filling and draining, etc. However, there has as yet been no thoroughly practical way of affording the advantages of moist or dry heat, selectively, together with accurate control of temperature at individual heating units of a food warmer.

Accordingly, it is an object of the present invention to provide a food warmer adapted to be heated by moist or dry heat selectively, with individual heating wells of the food warmer being accurately adjustable by indicated control to a desired temperature for a given food despite the application of a different temperature in a different well or unit and if moist heat is employed, a constant small volume of water is maintained so that the water is quickly warmed and remains at a constant level with respect to the food trays.

Another object of the invention is to provide a food warmer as described, in which individual wells are positioned for heating individual food containers, the wells being heated by thermostatically controlled means calibrated for either dry or moist heat and for a covered or uncovered condition of the container, dial means being used with the thermostats for visual indication of a proper temperature setting.

Another object of the invention is the provision of a food warmer as described, wherein the individual wells may be emptied or filled independently of the other wells.

Another object of the invention is to provide a food warmer as described, wherein water level means may be used to maintain a desired level in all or any of the wells, said means also serving as a vacuum breaker such as to meet city codes or ordinances such as are generally encountered.

Another object is the provision of individual wells as described, each having a depression formed in the bottom wall thereof for association with a heating element for the well, each of the wells being adapted to provide equalized temperature for all insets which may be inserted therein.

Another object of the invention is to provide an open atmosphere between the respective wells of the food warmer to maintain uniform control conditions therebetween.

Other objects and advantages of the invention will become apparent as the description proceeds in accordance with the drawings, in which:

Fig. 1 is a top plan view, partly broken away, of a food warmer according to the present invention;

Fig. 2 is a vertical sectional view taken along the lines 2—2 of Fig. 1;

Fig. 3 is a vertical sectional view taken along the lines 3—3 of Fig. 1;

Fig. 4 is a top plan view, partly broken away, disclosing features additional to those of Fig. 1;

Fig. 5 is a vertical sectional view taken along the lines 5—5 of Fig. 4;

Fig. 6 is a vertical sectional view taken along the lines 6—6 of Fig. 4;

Figure 7:
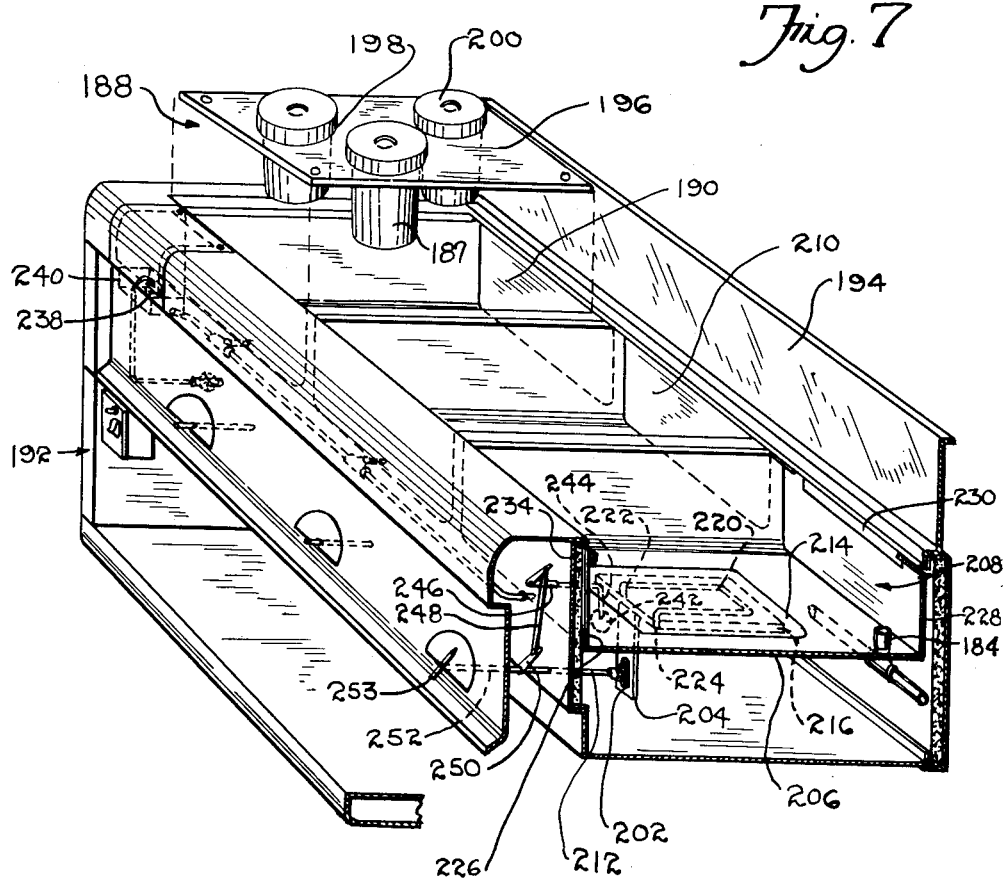
Fig. 7 is a perspective view of another embodiment of the food warmer of the invention.

Referring now to Figs. 1 to 6, a food warmer 10 is shown having an outer cabinet 12 of suitable material such as stainless steel, supported on legs 14, 16, 18 and 20 and having formed therein a pair of wells 22 and 24 adapted to provide moist or dry heat selectively. As hereinafter set forth when moist heat is provided the water control is automatic and runs continuously without attention.

As seen in Figs. 2, 3, 5 and 6, the cabinet 12 includes a lower enclosure 26 having a bottom wall 28 disposed upon an inverted, U-shaped channel 30 which is supported on the front legs 14 and 16, a back wall 32 and side walls 34 and 36, angular reinforcing elements 38 and 40 being secured along the sides and rearward bottom edges of the enclosure 26, respectively. The front edge of the bottom wall 28 is curved downwardly for appearance and safety purposes, and within the enclosure 26 preferably on one of the side walls such as wall 36, a master shut-off switch 42 is mounted having a pilot light 44 to show whether the food warmer 10 is energized.

The wells 22 and 24 are positioned in an upper box portion 46 of the cabient having side walls 48 and 50 secured along their lower edge by brazing or other suitable means to outwardly and downwardly turned flanges such as flange 52 of the side walls 34 and 36 of enclosure 26, the walls 48 and 50 being insulated so as to preserve heat generated within the portion 46. Thus, each of the side walls 48 and 50 has an inner wall such as wall 54 shaped to encase an insulating material such as the fiber glass 56, the upper ends of the side walls being turned inwardly as at 58 so as to cap the insulation.

A back wall 60 of the box portion 46 is also insulated by means of insulation 62 held by a secondary or inner wall 64, the upper end of the outer wall 60 being likewise turned inwardly at 65 to cap the insulation. The box 46 has a bottom wall 66 which rests on the side walls 34 and 36 at its front end by means of a downwardly and outwardly turned flanges 68, and on a shelf 70 formed at the upper ends of rear legs 18 and 20, the bottom wall 66 having a downwardly turned flange 72 which determines the spacing of the inner back wall 64 from the outer back wall 60.

A back splash 76 is mounted on the turned edge 65 of the wall 60, by means of a stepped construction 78 at its lower end and other suitable fastening means which will be understood by those skilled in the art. A removable access cover 79 is provided at the front of the enclosure 46; the cover 79 has an arcuate upper portion 80 an inset or recessed panel portion 82, and an inwardly turned bottom flange 84, which rests on the side walls 34 and 36 while the upper horizontal surface 86 is supported by an inner vertical front wall 88 positioned at its lower end on the flange 68 of bottom wall 66.

The upper surface 86 of the access cover 79 is turned downwardly and inwardly at 90 to provide an inner boundary corresponding to that of the stepped construction 78 of the back splash 76. The side walls 48 and 50 are also provided with U-shaped channels such as channel 92 having an inwardly extending flange 94 so positioned that a peripheral flange structure or shelf is formed for a cover 96 for the wells 22 and 24. The cover 96 has a depending peripheral flange 98 adapted to seat on the said shelf structure when desired.

In order to support the wells 22 and 24, a shallow, inverted channel 100 is secured to the underside of the stepped construction 78 and flange 84. The wells 22 and 24 have side flanges 102 and 104, and 106 and 108, the inner flanges 104 and 106 being affixed to an asbestos gasket 110 within the channel 100 and the outer flanges 102 and 108 being secured to an asbestos gasket 112 fastened to the flanges of the side wall cappings such as flange 94 on capping channel 92.

The wells 22 and 24 are each formed with die drawn depressions 114 and 116 in their bottom walls 118 and 120, these bottom walls being preferably spaced a distance above the bottom 66 of the enclosure 46 approximating the depth of the wells so as to afford room for heating and draining. Heating is provided in the embodiment shown in Figs. 5, 6, and 8 by means of electrical heating elements such as illustrated in Figs. 4, 5 and 6 and more clearly in Fig. 8 at reference numeral 112, fastened beneath black iron radiation plates 124 fitted within the depressions 114 and 116 of wells 22 and 24 retained in position by a plurality of bolts 126. Sheets of asbestos 128 beneath the heating elements 122 are held in place by the black iron plate 130, secured by bolts 132 and 134.

Figure 8:
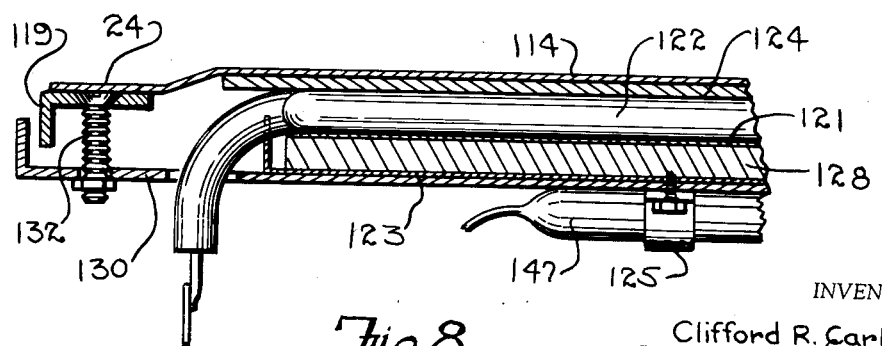
Fig. 8 is an enlarged sectional view taken along the lines 8—8 of Fig. 4.

With reference to Fig. 8 the heater 122 is removably held in place by means of an angle bar frame 119 welded to the bottom of well 24 to support the bolts 132 that hold the heater assembly releasably in place. The assembly comprises the radiation plate 124, the heater 122 in contact therewith, an upper aluminized steel reflecting plate 121 reflecting the heat upwardly, the asbestos sheet 128, another upwardly reflecting aluminized plate 123, and the plate 130.

This structure is readily removable for easy servicing in a manner not heretofore available. The heating element terminals 136 and 138 have leads 140 and 142, the terminals being affixed to a depending metal sheet 144. The thermostat bulb 147 may be mounted thereon in a transverse arcuate groove 146 secured by brackets 148 and 150 as shown in Fig. 5. Alternately the thermostat 147 may be mounted as shown in Fig. 8 on the bottom plate 130 by bracket 125 in heat-sensing position relative to the heating element 122. Control of the thermostat 147 is effected by the dials 152 and 154 which control the temperatures of wells 24 and 22 respectively. When located as shown in Fig. 8 more latitude is permitted for exacting operation.

However, it is one of the advantages of the present invention that heating and water level conditions for the respective wells 22 and 24 can be maintained in mutual equilibrium by water level and control means herewith described. A water fill tank 156 is mounted to a shelf 160 secured to the inner wall 88 within the compartment 158 formed by the removable access cover 79 and the inner front wall 88. Water is introduced into the tank 156 by a pipe 162 through an air vent or opening 164 in the front panel of enclosure 26 and controlled by a manually operable handle 165 within the enclosure 26. Leading from a predetermined level within the tank 156 is an inlet manifold defining inlet joints 168 and 170 brazed to the wells 22 and 24 respectively. Suitable water level control means may be provided within the tank 156, such as float means (157) as will be well understood by those skilled in the art, and accordingly, an equal level of water may be maintained in each of the wells 22 and 24 for precise temperature control and calibrated cooking conditions.

Each of the wells 22 and 24 is provided with a drain outlet 172 and 174 interconnected by a drain manifold 176 leading to an ultimate drain 178, the water fill tank 156 having an overflow drain tube 180 also brazed into the drain manifold at 182. Accordingly, each of the wells 22 and 24 may be operated independently of the other, and, for example, well 22 may be filled for moist heating while well 24 is drained for cleaning, suitable plugs being provided for the purpose. Likewise, standpipes such as the standpipe 184 may be inserted in the outlets 172 and 174 so that a predetermined water level may be maintained in the wells via the tank 156. These standpipes are preferably about 2″ long, and thus permit each well to be drained without disturbing the operation of the remaining wells. This has the advantage that the evaporation produced in heating the water to a desired extent does not necessitate constant refilling, as for example, every two hours or so, as has been the case with currently available food warmers.

In constructing the food warmer 10, it may be desirable to provide a dish shelf 186, which may be fastened by any suitable means, upon the upper surface 86 of the removable access cover 79, as shown more particularly in Figs. 4 and 6, but it being understood that this structure in itself forms no part of the present invention.

However, it is desirable to have a dry well insert 187 which extends below the water lever a short distance to provide dry well conditions if a particular food requires it when moist well operation is in progess. The well is first inserted and then the food dish. Thus a food dish can be kept from contact with the water if desired.

Also, as shown in Fig. 7, the upper compartment 188 may be positioned above a given well 190 of a food warmer 192 embodying the invention, utilizing the back splash wall 194 as a back wall and having a rectangular configuration with a top wall 196 provided with suitable openings 198 for receiving containers 200 to be heated.

It will be appreciated by those skilled in the art that the individual thermostatic control of the wells may be accomplished by means other than the bulb thermostat of Figs. 1–6, and, as seen in Fig. 7, a bimetal thermostatic control 202 may be used which is mounted on a depending heat-conductive angle plate 204 riveted to the bottom wall 206 of the well 208, wells 190 and 210 being fitted with similar thermostats (not shown). The thermostat 202 may be set by a rotatable control rod 212 to which a calibrated dial may be affixed in the manner of the first embodiment as is shown at 152 and 154 in Figs. 2 and 5.

In the embodiment of Fig. 7 the wells are formed with a depression such as the depression 214 of well 208, in which is secured a heating unit retaining housing 216 which is secured to the bottom wall 206. A tubular heating unit 220 is embedded in the housing 216 whose depending ends 222 and 224 are connected with the thermostat 202 and with suitable electrical terminals in a conventional manner.

As seen with respect to the well 206, the end walls 226 and 228 may be vented at their upper marginal edges as seen at 230, although this construction is needed only for gas heat. The wells themselves are secured to the back splash panel 194 and the inner side of the vertical wall 234. Float means for controlling the water level in the wells 190, 200 and 210 including a float 238 in a fill tank 240 is provided for controlling the water in each of the said wells simultaneously by suitable valve and adjustment means similar to that described above in the embodiment of Figs. 1–6. Thus, a relatively constant temperature can be maintained without an initial warm-up period as heretofore required by earlier designs. Moreover the need for refilling the wells after several hours of use such as earlier devices require is eliminated in my invention. The efficiency of the heat transfer system by the careful conservation of heat is increased, this being such that with covers on the well inserts, the well water with moist heat need be only 6° to 12° higher than the food and in the case of the dry wells the temperature need be only 20° to 30° F. higher than the food with covers off the wells in the range of 160° to 200° F. food temperature. This is to be contrasted with the need for a 35° to 110° F. increment over the food required in earlier designs where dry heat is used with covers on, or 90° to 170° F. increment with covers off. This feature will be seen to be of especial advantage where air conditioners are used, producing cooler top and side walls. It will also be understood that greater control of the food temperature is made possible by having well water and food temperatures approximate each other, and there results less leakage of heat from one section to another.

An additional refinement of my invention is seen in Fig. 7, which is adaptable for use with the embodiment of Figs. 1–6. Float means 242 are provided for each of the wells, in order to compensate for the wide differential between moist and dry heat just described. Thus, when the thermostat is set by dial (corresponding to dials 152 and 154) to a temperature suitable for cooking a given type of food with dry heat, as calibrated on the dial, the influx of water into the well will elevate the float 242 and thereby turn a crank 244 fixedly secured thereto so as to rotate a shaft 246 journaled in the well 208 and the inner wall 234, which carries a depending rod 248 pivotally connected to a linkage 250. The linkage 250 is fixed in turn upon a sleeve 252 which is fastened to the thermostat rod 212 for automatic compensation. However, it may be desired to journal the sleeve 252 upon the rod 212 and affix the dial to the outer end of the sleeve so that initial adjustment positions of the dial are determined in accordance with whether the well is wet or dry. A second indicator needle or pointer 253 is then connected to the rod 212.

There has thus been provided a food warmer combining versatility in use (in that sections may be heated individually or as a group) with accuracy of food temperature control (in that heat from individual sections does not materially alter conditions in adjacent sections while equal water level conditions may be provided with respect to all the units). Also, the temperatures may be accurately set according to whether wet or dry operation is used, and the wet operation does not entail fluctuation in temperature such as is produced by currently available equipment requiring frequent refilling with corresponding warm up periods and variation due to depletion of the water supply. Thus, the water level float control of the invention permits a substantially constant water level and temperature condition to prevail even over relatively long periods of use.

Although I have herein set forth and described my invention in considerable detail with respect to certain embodiments thereof, it will be understood by those skilled in the art that changes may be made therein without departing from the spirit and scope of the invention.

I claim:

1. In a food warmer of the type described, a housing, a plurality of wells supported in said housing, each of said wells defining a section for heating cooking insets by moist or dry heat selectively, a drain for each of said wells, a fill tank in said housing having an inlet manifold, said inlet manifold communicating with each of said wells for simultaneously filling said wells, each of said drains being manually closable for affording independent operation of said wells, means for heating each of said wells independently, and thermostatic control means for each of said wells, a float control in each of said wells, each of said float controls having linkage means operable thereby, said linkage means being connected to dial means for changing the calibration of said thermostatic control means in accordance with the condition of the well associated therewith.

2. In a food warmer of the type described, a housing, a plurality of wells supported in said housing, each of said wells defining a section for heating cooking insets by moist or dry heat selectively, a drain for each of said wells, a fill tank in said housing having an inlet manifold, said fill tank having water level means therein, said inlet manifold communicating with each of said wells for simultaneously filling said wells, each of said drains being manually closable for affording independent operation of said wells and means for heating each of said wells independently, thermostatic control means for each of said wells, said water level means affording calibrated heat control for a given level of water in said wells without variation from evaporation during use of the wells for heating, a float control in each of said wells, each of said float controls having linkage means operable thereby, said linkage means being connected to dial means for changing the calibration of said thermostatic control means in accordance with the condition of the well associated therewith.

3. In a food warmer for providing moist or dry heat selectively, a housing having insulated back and side walls, an inner front wall and an outer front wall, an automatic water fill tank disposed between said front walls and water supply means associated therewith, a plurality of wells disposed between said inner front wall and said back wall, an inlet manifold for introducing water from said water fill tank to each of said wells simultaneously, a drain in each of said wells whereby each of said wells may be emptied for cleaning or the like independently of the other wells, said fill tank having a drain communicating with said first named drains, heating means for each of said wells and thermostatic control means for each of said wells, each of said wells having float means positioned therein, a dial for each of said thermostatic controls and adjustable by said float means, and indicator means associated with said thermostatic means for setting a desired temperature for moist or dry heating in accordance with the operation of said float means.

4. In a food warmer for providing moist or dry heat selectively, a housing having insulated back and side walls, an inner front wall and an outer front wall, an automatic water fill tank disposed between said front walls and water supply means associated therewith, a plurality of wells disposed between said inner front wall and said back wall, each of said wells having a substantially horizontal bottom wall defining a central depression, heating means for each of said wells disposed substantially in said depression, an inlet manifold for introducing water from said water fill tank to each of said wells simultaneously, a drain in each of said wells whereby each of said wells may be emptied for cleaning or the like independently of the other wells, a standpipe removably inserted in each of said drains, said fill tank having a drain communicating with said first named drains, and thermostatic control means for each of said wells.

5. In a food warmer of the type described, a housing, a plurality of horizontally spaced wells supported in said housing and open to the atmosphere, each of said wells defining a section for controlling the temperature of food trays by moist or dry heat selectively, a drain for each of said wells, a fill tank in said housing having an inlet manifold, said inlet manifold communicating with each of said wells at a point above the bottom of the wells for simultaneously filling said wells and maintaining an equal level of water in said wells, each of said drains being manually closable by a standpipe extending above said level of water to afford independent operation of said wells, means supported on the bottom of each well on the outside thereof for heating each of said wells independently in intimate heat exchange relationship therewith, and manually adjustable themostatic control means for each of said wells for controlling said heating means.

6. In a food warmer of the type described, a housing, a plurality of wells supported in said housing, each of said wells defining a section for heating food trays by moist or dry heat independently selectively, a drain for each of said wells, a fill tank in said housing having an outlet manifold, said fill tank having water level means therein for maintaining a predetermined level of water therein above said manifold, said manifold leading therefrom and communicating with each of said wells above the bottom thereof for simultaneously filling said wells, each of said drains receiving removable standpipes in the wells extending above said predetermined level to afford independent operation of said wells, means for heating each of said wells independently, and manually adjustable themostatic control means for each of said heating means, disposed in metal heat conductive relationship with the heating means to afford calibrated heat control for a given level of water in said wells without variation from evaporation during use of the wells for food warming.

7. In a food warmer for providing moist or dry heat selectively, a housing having insulated back and side walls, an inner front wall and an outer front wall, an automatic water fill tank disposed between said front walls to maintain a predetermined water level therein and water supply means associated therewith, a plurality of wells spaced horizontally and disposed between said inner front wall and said back wall, an inlet manifold for introducing water from said water fill tank to each of said wells simultaneously, a drain in each of said wells for emptying each of said well independently of the other wells including a removable standpipe extending to a point above said water level, said fill tank having a drain communicating with said first named drains, heating means for each of said wells and thermostatic control means for each of said heating means disposed in heat exchange relationship therewith, and means for adjusting any thermostat in relationship to the presence or absence of water in its respective well.

8. In a food warmer for providing moist or dry heat selectively, a housing having insulated back and side walls, an inner front wall and an outer front wall, an automatic water fill tank disposed between said front walls, water supply means associated therewith including a float valve for maintaining a predetermined level in said tank, a plurality of horizontally spaced wells disposed between said inner front wall and said back wall, an inlet manifold for introducing water from said water fill tank to each of said wells simultaneously at points above the bottoms thereof, a drain in each of said wells whereby each of said wells may be emptied independently of the other wells including a removable member maintaining said level, said fill tank having a drain communicating with said first named drains, heating means for each of said wells disposed in intimate heat exchange contact with and below the bottoms of the respective wells and thermostatic control means for each of said heating means in metal heat conducted relationship therewith, said outer front wall providing a shield for said thermostat against ambient air movement.

9. In a food warmer for providing moist or dry heat selectively, a housing, an automatic water fill tank disposed in said housing, water supply means associated therewith including a float valve for maintaining a predetermined level in said housing, a plurality of horizontally spaced wells disposed in said housing, each of said wells having a substantially horizontal bottom wall with a raised depression in the center thereof, an inlet manifold for introducing water from said water fill tank to each of said wells simultaneously at a level above said depression, a drain in each of said wells for emptying each well independently of the other wells, a standpipe removably inserted in each of said drains for maintaining said predetermined level in said wells, said fill tank having a drain communicating with said first named drains, heating means received in the depression of each of said wells, and thermostatic control means for each of said heating means.

10. In a food warmer for providing moist or dry heat selectively in a closed compartment beneath a food tray, a housing having back and side walls, an inner front wall and an outer front wall, an automatic water fill tank disposed between said front walls and water supply means associated therewith for maintaining a body of water at a predetermined level, a well disposed between said inner front wall and said back wall defining said compartment and having a substantially horizontal bottom wall having a central raised depression the top of which is below said predetermined level, a cover for said well having an opening to receive a food tray, heating means disposed below said bottom wall in said depression including a radiating plate against said bottom wall, an electric heater engaging said plate, a reflecting plate below said heater and a thermostat below and in heat exchange relationship with said reflecting plate, an inlet conduit for introducing water from said water fill tank to said well at a point above the level of said raised depression, a drain in said well in said bottom wall at one side of the depression for emptying the well, a standpipe removably inserted in said drain extending to a point above said predetermined level, said fill tank having a drain communicating with said first named drains.

11. In a food warmer for providing moist or dry heat selectively for food trays, a housing having back and side walls, an inner front wall and an outer front wall, an automatic water fill tank disposed between said front walls and water supply means associated therewith for maintaining a body of water at a predetermined level, a plurality of horizontally spaced wells disposed between said inner front wall and said back wall each having a substantially horizontal bottom wall defining a central raised depression the top of which is below said predetermined level, a cover for each well having an opening to receive a food tray, heating means disposed below the bottom wall of each well in said depression including a radiating plate against said bottom wall, an electric heater engaging said plate, a reflecting plate below said heater and a thermostat below and in heat exchange relationship with said reflecting plate, an inlet conduit for introducing water from said water fill tank to each of said wells at points above the levels of said raised depression, a drain in each well in the respective bottom walls at one side of the depression therein for emptying each well separately, standpipes removably inserted in said drains extending to a point above the said predetermined level, said fill tank having a drain communicating with said first named drains, and means on the front wall for adjusting the thermostats independently of each other.

References Cited in the file of this patent

UNITED STATES PATENTS

| 692,516 | Higgins | Feb. 4, 1902 |
| 938,414 | Dickson | Oct. 26, 1909 |
| 1,011,061 | Huppert | Dec. 5, 1911 |
| 1,433,157 | Schwimmer | Oct. 24, 1922 |
| 1,595,188 | Hadaway | Aug. 10, 1926 |
| 1,693,522 | Medearis | Nov. 27, 1928 |
| 2,259,519 | Ershler | Oct. 21, 1941 |
| 2,443,417 | Duncan | June 15, 1948 |
| 2,563,253 | Levin | Aug. 7, 1951 |
| 2,626,754 | Parker et al. | Jan. 27, 1953 |
| 2,679,841 | Muckler | June 1, 1954 |
| 2,750,937 | Stolund | June 19, 1956 |
| 2,762,360 | Knoy | Sept. 11, 1956 |